(12) United States Patent　　(10) Patent No.: US 7,774,750 B2
Chrysanthakopoulos　　(45) Date of Patent: Aug. 10, 2010

(54) COMMON CONCURRENCY RUNTIME

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1228 days.

(21) Appl. No.: 11/184,285

(22) Filed: Jul. 19, 2005

(65) Prior Publication Data

US 2007/0027912 A1　　Feb. 1, 2007

(51) Int. Cl.
*G06F 9/52* (2006.01)
*G06F 9/46* (2006.01)
*G06F 9/44* (2006.01)

(52) U.S. Cl. .................. 717/119; 717/114; 717/163; 719/331

(58) Field of Classification Search ................. None
See application file for complete search history.

(56) References Cited

U.S. PATENT DOCUMENTS

| | | | |
|---|---|---|---|
| 5,940,827 A | 8/1999 | Hapner et al. | 707/8 |
| 6,233,619 B1 | 5/2001 | Narisi et al. | 709/230 |
| 6,658,490 B1 | 12/2003 | Williams et al. | 709/330 |
| 6,697,870 B1 * | 2/2004 | Cafarelli et al. | 709/233 |
| 2002/0138706 A1 * | 9/2002 | Hugly | 711/163 |
| 2003/0074584 A1 | 4/2003 | Ellis | 713/201 |
| 2003/0225899 A1 | 12/2003 | Murphy | 709/230 |
| 2004/0236914 A1 | 11/2004 | Day et al. | 711/152 |
| 2004/0244004 A1 | 12/2004 | Pardon et al. | 718/100 |
| 2005/0044301 A1 | 2/2005 | Vasilevsky et al. | 711/1 |
| 2005/0080947 A1 | 4/2005 | Joy et al. | 710/33 |

FOREIGN PATENT DOCUMENTS

WO　　WO 00/75788 A1　　12/2000

OTHER PUBLICATIONS

Author: Benton Title: "Modern Concurrency Abstractions for C#" Date: Jun. 10-14, 2006 URL: http://research.microsoft.com/en-us/um/people/nick/polyphony/PolyphonyECOOP.A4.pdf.*

(Continued)

*Primary Examiner*—Lewis A Bullock, Jr.
*Assistant Examiner*—Joseph Kelly
(74) *Attorney, Agent, or Firm*—Woodcock Washburn LLP

(57) ABSTRACT

The common concurrency runtime (CCR) provides a simple and self-consistent set of concurrency primitives that developers can use to more readily split their computation into more discrete chunks that can scale better with additional processors. This set of primitives provides for very scalable applications that are well suited for the coming world of ubiquitous communication and very large scale out for the number of local processors. The CCR may be implemented as a single library in C# that implements channels with input and asynchronous output capabilities, along with an atomic test-and-input primitive. On top of this, richer derived operators (e.g., choice, join, replication, reader-writers, scatter-gather, etc.) may be encoded. Thus, existing C# may be built upon to provide the capability to concurrently issue I/O requests to remote systems while simultaneously performing other functions locally to increase the efficiency of the distributed system. Because it is based on C#, the CCR allows users to take advantage of a well-known programming model to address unique issues in a new programming environment.

20 Claims, 3 Drawing Sheets

OTHER PUBLICATIONS

Author: Herescu et al. Title: "Probabilistic asynchronous pi-calculus" Date: Sep. 3, 2001 URL: http://arxiv.org/PS_cache/cs/pdf/0109/0109002v1.pdf.*
Author: Cremet Title: "Join definitions in Scala" Date: Jan. 31, 2003 URL: http://lamp.epfl.ch/~cremet/join_in_scala/index.html.*
Author: Hitchens Title: "Java NIO" Date: Aug. 27, 2002 URL: http://proquest.safaribooksonline.com/0596002882.*
Author: von Itzstein Title: "On Implementing High Level Concurrency in Java" Date: 2003 URL: http://joinjava.unisa.edu.au/publications/implementing2003itzstein.pdf.*
Author: Li Title: "Implementing the pi-Calculus in Java" Date: Mar. 4, 2005 URL: http://www.jot.fm/issues/issue_2005_03/article5/.*
Author: Masuyama Title: "Asynchronous Pi-calculus" Date: Apr. 1, 2004 URL: http://web.archive.org/web/20040401041236/http://www.yl.is.s.u-tokyo.ac.jp/~tak/slide/Scope.ppt.*
Author: Maye Title: "Implementations of the pi-calculus" Date: Jun. 1, 2005 URL: http://icwww.epfl.ch/~theodulo/documents/2005-consem-pi-implementations-slides.pdf.*
Author: Chauhan; Title: "Dynamic Link Libraries Inside-Out"; Date: Sep. 15, 2004; URL: http://www.aspfree.com/index2.php?option=content&task=view&id=2218&pop=1&hide_ads=1&page=1&hide_js=1.*

Teja NP-An Integrated Approach to NPU Software Development, Teja Products/Intel® IXP2000 http://64.233.161.104/search?q=cache:21XftKUv-0gJ:www.teja.com/products/intel_ixp2xxx_detail.html+Common+concurrency+runtime+latency&hl=en, May 13, 2005, 4 pages.
Benton, N., "Programming Principles and Tools Group", The Essence of Xen, Microsoft Research Cambridge, http://64.233.161.104/search?q=cache:TT1Hrlb9AtEJ:download.microsoft.com/download/a/9/c/a9c05370-42bb-4356-b958-7883ef3e3ed3/200407_03-03_Comega_nickbenton.ppt+Common+concurrency+runtime+latency&hl=en, May 13, 2005, 44 pages.
Chapter 6 Discussion, http://64.233.161.104/search?q=cache:NThsnjT9YcoJ:vip.cs.utsa.edu/research/mobileviz/pubs/laurasthesis/chapter6plaintext.html+latency+distributed+operating+system&hl=en, May 13, 2005, 8 pages.
Pope, S.L. et al., Enhancing Distributed Systems with Low-Latency Networking, http://64.233.161.104/search?q=cache:0c6dL1IxzP4J:www-lce.eng.cam.ac.uk/publications/files/tr.98.6.pdf+latency+distributed+operating+system&hl=en, May 13, 2005, 16 pages.

* cited by examiner

COMMON CONCURRENCY RUNTIME

BACKGROUND OF THE INVENTION

A known problem in computer science involves effective programmability around concurrency. Existing programming paradigms involve such things as threads, mutexes, semaphores, critical sections, and other primitives. Though these have been around for decades, they are hard to use properly without inducing hard-to-find timing bugs, or inadvertently serializing access through code sections via improper locking hierarchies.

Though this has been an issue in the past, developers typically did not worry about it because they could count on their purely sequential code automatically running faster due to ever increasing CPU clock rates. This is changing, however, now that clock rates have hit the thermal barrier and CPU vendors are moving toward multi-core designs. This means that for a software developer to make their code run faster, they will need to split the work into multiple concurrent sections that can run across 2, 4, 32, 64, or even hundreds of local processors in a single machine. This is difficult to do with threads.

Additionally, there are latencies in distributed operating systems. For example, if a user issues a read request from their local disk using traditional local architectures, they are assured to get data back within a few milliseconds. But if the user does the same thing over a network to a remote machine, it may take seconds or minutes or forever to return the data. A new language called C-Omega has been developed and provides an alternative to threading for dealing with local concurrent programming. C-Omega, however, requires an entirely new language, infrastructure and toolchain (debuggers, etc.). Also C-omega takes a declarative approach, where any programming primitives are fixed at compile time and cannot be modified or adjusted based on runtime information. It would be desirable, therefore, if a mechanism were available to address the problem of concurrency and coordination in a concurrent and potentially distributed operating system, without the need for a new language.

SUMMARY OF THE INVENTION

The common concurrency runtime (CCR) provides a simple and self-consistent set of concurrency primitives that developers can use to more readily split their computation into more discrete chunks and coordinate results in a concise manner so that the applications can scale better with additional processors and the complexity of software can be kept small relative to programming with threads. This set of primitives provides for very scalable applications that are well suited for the coming world of ubiquitous communication and very large scale-out for the number of local processors.

The CCR may be implemented as a single coordination/concurrency library in C# that implements channels with input and asynchronous output capabilities, along with an atomic test-and-input primitive. On top of this, richer derived operators (e.g., choice, join, replication, reader-writers, scatter-gather, etc.) may be encoded. Thus, the invention may build upon the existing C# to provide the capability to concurrently issue I/O requests to concurrent processes while simultaneously performing other functions locally to increase the efficiency of the system. Because it is based on C#, it allows users to take advantage of a well-known programming model to address unique issues in a new programming environment.

The invention provides an implementation of a type safe queue and collection of queues that may be referred to as channels or ports. These ports have First-In-First-Out semantics and are similar to the channels described in many process algebras. They have input and asynchronous output capabilities, and atomic test-and-input primitives. The port architecture allows a lock-free, flexible implementation of message coordination primitives like choice, join, replication, and other higher level operators. Higher levels of abstraction can be built using a small number of primitives. Any number of other concurrent languages including C-Omega, Join-Java, etc., could compile down to the ports and the basic coordination primitives. The scheduling model in particular allows an efficient and simple way to interface with legacy systems, where threading and thread affinity has to be taken into consideration.

All interaction is through the core interaction primitive—i.e., a port. Receivers may be "attached," i.e., waiting on a port, and messages may be posted. When a message arrives, code executes with the message as a parameter. In a preferred embodiment, everything is asynchronous. The CCR may include a hierarchical arbitration procedure, and arbiters may be nested. Coordination primitives can be nested, and a coordination primitive may, itself, be executed as another work unit. Thus, the invention provides an extensible messaging system with defined coordination primitives. A scheduler, or dispatcher, may be provided to take the union of messages with receivers and activate them. The dispatcher may be decoupled from the port and arbiter implementations.

According to an aspect of the invention, everything may be treated as a task. Because one can determine how long it takes to run a task, one can throttle down the CPU time used according to a desired formula. Such throttling may be based on simple feedback control to effectively control runtime CPU usage.

Thus, the invention provides an extensible coordination and concurrency library that can be embedded in existing languages and be targeted by new languages.

DETAILED DESCRIPTION OF ILLUSTRATIVE EMBODIMENTS

Example Computing Environment

Figure 1:
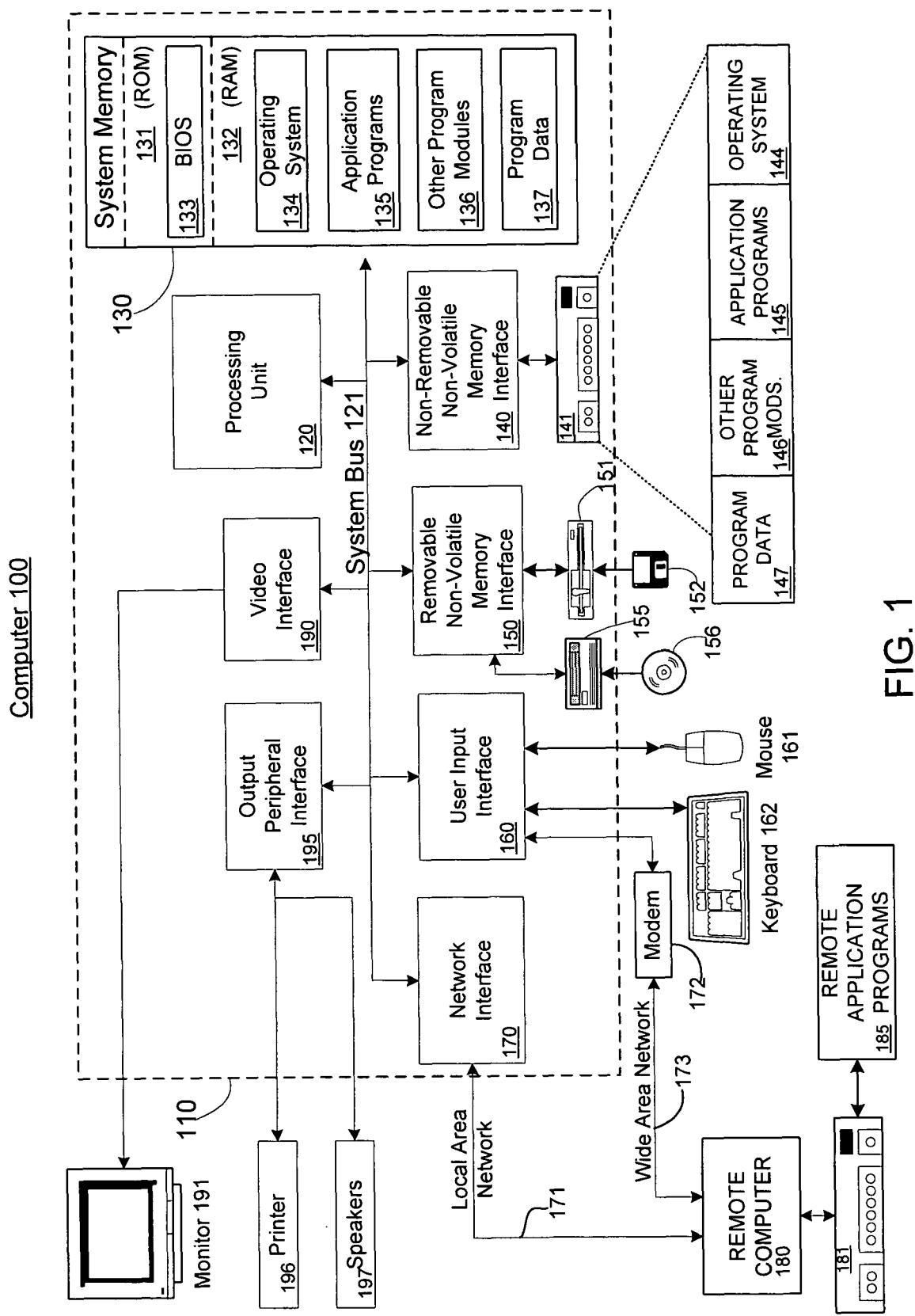
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Common Concurrency Runtime

Common Concurrency Runtime (CCR) may be implemented as a C# library for concurrency. At its core are pi-like channels with input and asynchronous output primitives, along with an atomic test-and-input primitive. On top of this, richer, derived operators (e.g., choice, join, replication, readers-writers) may be implemented.

A CCR application running on a machine may include:

1. A set of ports. Each port is associated with a list of types. A port contains an ordered list of pointers to objects in memory. These constitute "asynchronous messages" on the port. Every message must be one of the listed types. The port has an atomic operation "test for a message and remove it if present."

2. A set of dispatchers, usually one per CPU. Each dispatcher has a set of tasks. Each dispatcher also has a set of scheduler threads, typically one per physical processor, which take tasks and execute them.

3. Tasks consisting of a list of storage slots for formal arguments, and a C# delegate (namely, a pointer to an object's method and a pointer to an object instance, or a pointer to a static method with no instance pointer).

4. A set of arbiters that are waiting for appropriate messages before they can continue. When the arbiter is created, it is registered with a specified set of ports. When some execution context like a C# function running in a thread, posts a message to a port, it first appends the message to the port's list, then executes every arbiter who is registered on the port and unregisters the first arbiter that consumed the message, then returns. All arbiters are expected to be very lightweight and to terminate always. It is through arbiters that other concurrency operators (join, choice, replication, etc.) may be encoded. The typical role of an arbiter is to execute a small piece of code and then either to create a new arbiter, or to add a task to a particular dispatcher. This keeps the cost of calling Post( ) on a port, close to O(1) for a small number of arbiters (since the first arbiter to see a message usually consumes and schedules a task, stopping any further checks).

An application is created by running it from the command line. It creates dispatchers, which in turn create their scheduler-threads. Each scheduler-thread proceeds picking up a task and executing it. This execution may create new ports, or add messages to ports (thus triggering the execution of arbiters), or create arbiters or tasks in the current dispatcher.

Messages are asynchronous, but order-respecting. The CCR is asynchronous in the sense that when a task posts a message it continues immediately rather than waiting for the message to be received. Patterns that may be used include state-as-message and scatter-gather. In state-as-message, the state of a process is represented as an asynchronous message to an internal port. In scatter-gather, a dynamically-determined number of "work units" are created to do some tasks in parallel. Then a join/select command waits until they have all finished or one has generated an error. The dynamic, variable nature of the choice and join primitive is a feature of this invention not found in C-omega, join java, or other similar efforts.

A "work unit" is a linear sequence of commands. The commands are to (1) create a new port, (2) create a new task (delegate) and append it to the dispatcher's list of tasks, (3) post a message to a port, (4) create a new arbiter and register it on the ports it wants to watch.

Rather than registering it immediately on its ports, a new task may be created which will do the registering later, e.g., when it comes to be executed. An "activate" may be used for creating this task and appending it to the dispatcher's list. To append a task to the dispatcher's task-list, the dispatcher may manage its own port, and an "append-task" message may be posted to the dispatcher. It should be understood that a language may be developed in which a work unit consisted solely of message-postings: to create a new port, it posts a message to the new port-creating service that is expected to be present, and so on.

The "New" command allocates a fresh port. The port is indexed by the types it can carry. Within C# programming of the CCR, it is a compile-time error to post an invalid type, or to activate a handler which waits for an invalid type. An example New command is:

Port<int,string>p=new Port<int,string>( ); . . .
   (vp$_i$:<int>, p$_s$:<string>)( . . . ).

The "Par" command creates a new task. An example Par command is:

spawn<int>(5,MyIntHandler); . . .

.

static void MyIntHandler (int i)
{ . . . }.

It is modeled by the | operator in process calculi. Instance methods may be used instead of static methods (in which case the parameters are not useful), either inline delegates or out of line:

Delegate:

---
spawn<int>(5, delegate(int i){...} ).
Instance Method:
   spawn<int>(5,MyIntHandler);
   void MyIntHandler (int i) { ... }.
---

The "Post" command posts an asynchronous message. Messages are ordered in CCR. It is a compile-time error to post a message that has the wrong type for the port. An example Post command is:

p.post(3); . . .
$\bar{p}_i$<3>| . . .

Arbiter: Simple Input. Following are two syntaxes for input. The first uses a delegate, so as to write the continuation inline. The second uses a static method, or can use an instance method.

With delegate:

---
activate(p.with(delegate(int i){P1})); P2.
With method [static or not]:
   activate(p.with(MyIntHandler)); P2

.
.
[static] void MyIntHandler(int i) {P1}
   (p$_i$(i).P$_1$) | P$_2$.
---

The activate command creates a task and p.with creates an arbiter. When the task is scheduled, it registers the arbiter on port p. When a message eventually arrives, it executes the arbiter (thus, unregistering the arbiter). The arbiter is a simple one that merely creates a task for subsequent scheduling. When this next task is scheduled, it attempts an atomic test-and-remove operation on the port. If successful, it executes the delegate (first case) or static method (second case). If unsuccessful, the arbiter is re-registered to watch for subsequent messages.

A two-phase form of message reception may be employed. In the first phase, the arbiter watches enough messages arrive until it thinks its continuation may be able to run. In the second phase, an attempt is made to get the necessary message atomically before running the continuation. This two-phase technique becomes more useful with more complicated arbiters, particularly for join and choice.

Arbiter: Choice. Following is an example that uses a choice arbiter.

activate(

---
   p.with(MyIntHandler)
   | timeoutport(new Timespan(1000)).with(MyTimeoutHandler)
); P1
      (p$_i$(i).IntHandler + p$_{to}$( ).MyTimeoutHandler)|P$_1$
---

This arbiter listens on both p$_i$ and p$_{to}$. When a message arrives on either one, it creates a task for subsequent scheduling. The task attempts an atomic test-and-remove operation on the port which, if successful, executes its continuation. If unsuccessful, it re-registers the arbiter.

The following synchronous version of choice waits until the handler has finished executing before it continues:

---
select(
   p.with(MyIntHandler)
   | timeoutport(new Timespan(1000)).with(MyTimeoutHandler)
); P2
      p$_i$(i).(IntHandler; P$_1$) + p$_{to}$( ).(MyTimeoutHandler; P$_2$)
---

Arbiter: Join. In CCR, "join" is a multi-way version of the pi calculus input command. An example join is:

---
activate(
   join<int, string>(p, p).with(MyIntAndStringHandler)
); P$_1$
      (p$_i$(i) $\hat{\,}$ p$_s$(s).MyIntAndStringHandler) | P$_1$.
---

The arbiter is awoken when a message arrives on p$_i$ or p$_s$. The second time it is awoken (i.e., when messages have arrived on both), it schedules a continuation task. This continuation task tries atomically to test-and-remove a message from each of p$_i$ and p$_s$, in alphabetical order. If it succeeds on both, then it executes MyIntAndStringHandler. Otherwise, it reinserts the messages that it received and goes back to waiting.

Note that there are many arbiters looking on the same channels. So, when p$_i$ and p$_s$ have arrived, they may schedule continuations in many different dispatchers. Every one of these continuations will attempt to test-and-remove in alphabetical order. Exactly one of the continuations will succeed, and the others will restart their waiting. Therefore, this encoding of join is divergent locally but not globally. Compare this to the encoding of join into pi (which is divergent). The different in expressivity is due to CCR having test-and-remove and alphabetical orderings on ports. Pi-calculus, for example, cannot express these.

The CCR's two-phase implementation of joins (first waking up arbiters, then doing test-and-remove) is more practical than the finite state automata technique used in Join Calculus. That is because it allows extra joins to be added at runtime without recompiling the machine, and the size of the join automata increase non-linearly with number of inputs.

The following is an example of a "dynamic join."

```
Port<int,string> p;
// suppose some service will either post N integer messages
to p (denoting success of
// each of N sub-services), or at least one string message
to p (denoting failure). Then
activate(
    joinvariable<int>(p, N, delegate(int[] oks) {...})
    | p.with(delegate(string failmsg) {...})
).
```

Note that this kind of dynamic join (where the number of conjuncts is not known at compile-time) is easy to implement, given the "arbiter" implementation. Another variation is allowed, of constructing a dynamic join on an arbitrary set of ports (rather than waiting for N messages on a single port as here). Dynamic select is also easy to implement.

This dynamic join can be implemented in a conventional process calculus that has no dynamic joins. For example, one could write a multi-way join service that does a 1-way join if the list had one element, a 2-way join if it had two elements, and so on, up to some bound. Such a multi-way join service should be adequate for modeling dynamic joins in many situations.

As the number of messages that are to be sent is unknown at compile time, joinvariable(single port, many messages) and joinarray (many ports, one message each) provide a concise way to gather any number of messages known only at runtime.

Arbiter: replication. The following is an example of a replication arbiter.

activate(!p.with(MyIntHandler));
    !p$_i$(i) ...

The replication arbiter watches for a message on p$_i$. If it arrives, then it triggers a test-and-remove continuation as normal, but it also persists.

The way CCR makes use of parallelism in the hardware is that it uses one or more scheduler-threads per CPU for executing work units. More concurrency can be provided with an advanced primitive known as an "interleave." An example interleave may be:

```
activate(
    exclusive(p.with(DoneHandler), !p.with(UpdateState))
    concurrent(!p.with(GetState), !p.with(QueryState))
).
```

The interleave provides more concurrency, and is less verbose and error-prone compared to a join. It captures the pattern of multiple reader/single writer and protects continuations until return to scheduler. Interleave provides atomicity guarantees until sequential state machine is complete. Accordingly, continuations can be iterators. Interleave uses interlocked routines and ports to queue reader/writers. Again, there is no thread blocking.

At runtime, all APIs create Tasks which can be scheduled by a dispatcher. A resource manager allocates dispatchers, which can all be ion the same resource group. Multiple front-end queues may share "TaskExecutionWorker" threads, which load-balance tasks. Queues are just ports. The ability to associate a dispatcher per task/arbiter leads to easy interoperability for STA-threaded legacy code, and provides flexibility to the programmer.

"Iterators" allow people to write sequential, non blocking code, which may greatly increase readability. The iterator pattern from C# 2.0 may be used according to the invention in a novel way. Loops, for example, now become easy again even if they involve asynchronous messaging. A point of novelty is that since the CCR runtime operates on tasks, user code may be turned into iterators over tasks. That is, they can yield to a choice arbiter, join, etc., because it runs a task to be scheduled. That will eventually make progress and allow the scheduler to "iterate" over to the next logical block in the user's code.

Examples of iterators follow:

```
IEnumerator<ITask> Iterator(int num)
{
    Port<int,string> p = new Port<int,string>( );
    for (int i = 0; i < num; i++)
    {
        p.post(i);
        // we yield below, when the i/o arrives on port p, we will execute
        // the inside of the delegate and call Trigger( ).
        // Then the loop will continue just like in normal C/C#
        synchronous code.
        // All this without blocking a thread.
        yield return p.with(delegate(int j)
        {
            Trigger( );
        });
    }
}
IEnumerator<ITask> IteratorOnJoin(int num)
{
    _pTest = new Port<string, int, float>( );
    for (int i = 0; i < num; i++)
    {
        _pTest.post(i);
        _pTest.post(i.ToString( ));
        // when the join is satisfied, the loop will continue
        yield return join<int, string>(_pTest, _pTest).with(delegate(int j,
        string s)
        {
            Trigger( );
        });
    }
}
IEnumerator<ITask> IteratorOnChoiceAndJoin(int num)
{
    _pTest = new Port<string, int, float>( );
    for (int i = 0; i < num; i++)
    {
        _pTest.post(i);
        _pTest.post(i.ToString( ));
        // another interesting use of the iterator. When either branch of the
        // choice fires, then the loop continues
        yield return
            (_pTest.with(delegate (float f) { })
            |
            join<int, string>(_pTest, _pTest).with(delegate(int j, string s)
            {
                Trigger( );
            }));
    }
}
```

Example Programming Model For Concurrency And Distribution

Figure 2:
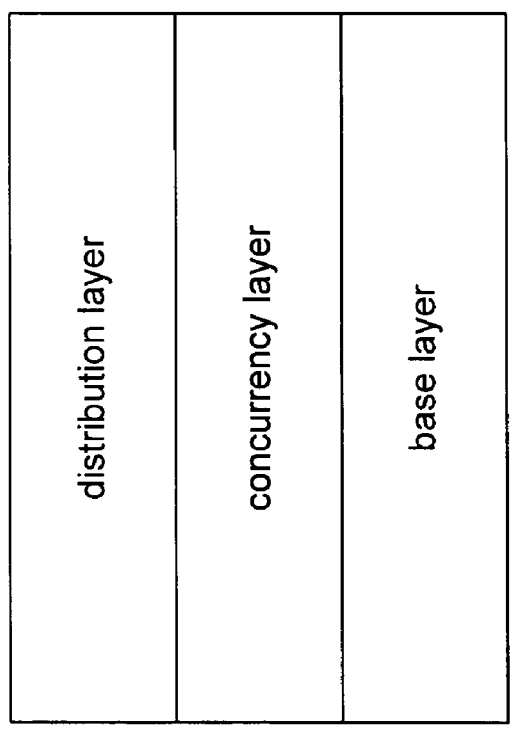
FIG. 2 provides an example programming model for concurrency and distribution.

An example programming model for concurrency and distribution is depicted in FIG. 2. The base layer contains the existing programming constructs from the CLR (or from any other acceptable base). This layer supports the ordinary sequential programming model used in systems today. The concurrency layer adds new local constructs for concurrency, replacing the existing Win32/CLR constructs with new, more modern constructs that are easier to understand, easier to use, easier to check, and altogether easier to get right. The concurrency layer may be separated from the base layer to keep from making ordinary sequential programming as hard as concurrent programming. Where the CCR is implemented in a distributed environment, a distributed layer may provide new constructs for dealing with programming problems unique to distributed systems. It may incorporate a failure model, a security model, etc. The distributed layer may be separated from the concurrency layer to keep from making local programming as hard as distributed programming.

The CCR is a concurrency layer atop the CLR base layer. The Decentralized System Services (DSS) architecture may build upon the CCR to support a distributed layer. It should be understood that the CCR does not itself address problems unique to distributed systems—e.g., marshalling, versioning, failure, security, etc. In particular, a program using the CCR may run on a single machine. It cannot fail in part. That is, if any part of a program fails, the entire program fails. Also, it runs in a single security domain.

A CCR program may execute in a number of asynchronous "actions." Actions are similar to threads or tasks or work items in other systems. In its current implementation, the CCR sometimes uses Win32/CLR threads internally, and CCR programs must not bypass the CCR to use Win32/CLR threads or perform synchronization, either directly or indirectly through a library. The programmer must be careful to avoid such cases, which have no meaning.

A CCR program may have an "initial" action, and any action can start "new" actions. Individual actions can terminate, and the entire program terminates once all of its actions have terminated. One way to start a new action is by calling "spawn," specifying a method for the new action to call, and a list of arguments. For example, a first action might call spawn as follows:

spawn<string>(LogMethod, "Program initializing");

to start a new action that calls LogMethod with the string argument "Program initializing" and then terminates when the method returns. LogMethod may, for example, print the message to the console:

static MsgSuccess LogMethod(string msg) {Console.WriteLine(msg);}, so this call to spawn will log the message asynchronously while other actions proceed with program initialization. An alternative is for the programmer to use an anonymous delegate to specify the method inline:

```
spawn<string>(delegate(string msg) { Console.WriteLine(msg); },
    "Program initializing");
```

While spawn is one way to start new actions, another way to start new threads is by sending messages to ports. As described below, the program can register certain types of actions to start when certain messages arrive at certain ports.

The CCR provides a message-passing programming model. Programs can send asynchronous "messages" to "ports," and these messages can start new asynchronous actions. The simplest kind of port receives messages of some specified type. For example, Port<string>log=new Port<string>( );

constructs a new port "log" for messages of type "string." A program calls "with" and "activate" to "bind" a method to a port and to "activate" the binding:

```
activate(
    !log.with(delegate(string msg) { Console.WriteLine(msg); }));
```

Here, the ! operator constructs a repeating binding. Preferably, the CCR contains a whole algebra of operators that create bindings with special properties. An ordinary binding is automatically deactivated the first time it starts a new action, but a repeating binding remains activated. A non-activated or deactivated binding has no effect.

Once the method is bound, posting a message to "log" (using "log.post") will start a new action that calls the method with the message as its argument.

```
log.post("Hi!");
...;
```

As in the earlier example, this might print the message asynchronously while other actions proceed with other work.

Figure 3:
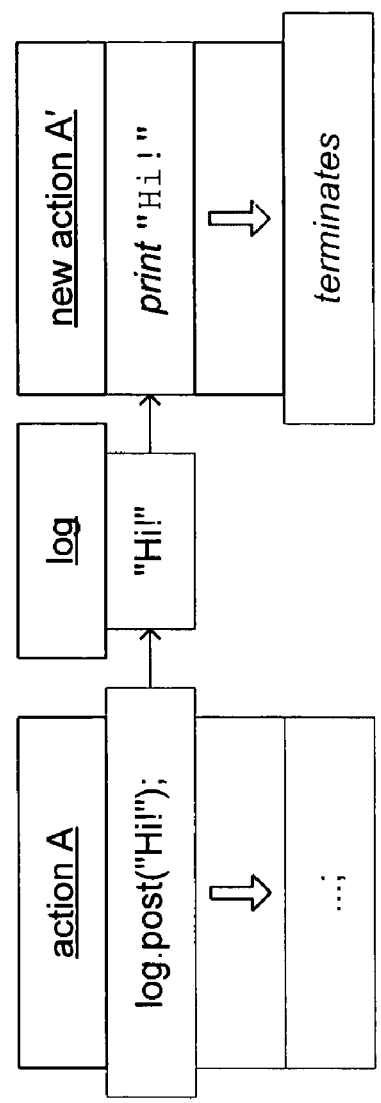
FIG. 3 illustrates a data and control flow example.

FIG. 3 illustrates the data flow and control flow for this example. Some action (A) posts the message "Hi!" to log, and continues its execution. When the message arrives at log, it becomes the argument to the method in a newly created action (A'), which prints its argument and terminates. Actions A and A' can execute concurrently.

In this example, posting multiple messages to log will start multiple actions that can run concurrently. In this program:

```
log.post("Copyright © 2005");
log.post("All rights reserved.");
log.post("Program initializing");
``` the three messages may be output in any of six orders.

The CCR features described above can be used to start any number of new actions. Each action may be independent of all others. A join is a new kind of binding that enables actions to synchronize and communicate. It specifies a method for a new action when messages arrive at more than one port.

Consider the example of a cashbox that holds n dollars. We can deposit more dollars when we want, and we can request (i.e., ask to know) the current balance. First we define new ports "deposit," "balanceRequest," and "balance."

Port<int>deposit=new Port<int>( ): The "deposit" port takes an "int" from the client, and its action increments the balance by the specified amount.

Port<Port<int>>balanceRequest=new Port<Port<int>> ( ): The "balanceRequest" port takes a continuation port (which is called a continuation port by analogy to continuations in programming languages) that takes an "int," and its action returns the current balance to that port.

Port<int>balance=new Port<int>( ): The "balance" port takes an "int" as an argument (i.e., as a message), representing the current balance. The client cannot post directly to "balance;" it is internal to the implementation.

Next, we bind methods to these ports, calling "join" to construct a join binding:

activate(!join<int, int>(balance, deposit)
    .with(delegate(int b, int d) {balance.post(b+d);}));

This "join" constructs and activates a binding to start an action when an "int" is at "balance" and an "int" is at "deposit." If one of these messages arrives first, it can wait for the other. If multiple messages are waiting at a single port, they can start actions only in their order of arrival. A "post" never waits to send its message or to run the resulting action. This action calls the delegate with these messages as arguments, and the delegate posts the new balance to "balance." Thus, the current balance for the cashbox is always waiting at "balance." Again, the ! operator constructs a repeating binding, to allow multiple deposits. To summarize, this action consumes the "balance" and "deposit" messages, and posts a new "balance" message.

```
activate(!join<int, Port<int>>(balance, balanceRequest)
    .with(delegate(int b, Port<int> continuation) {
        balance.post(b);
        continuation.post(b);
    }));
```

The "join" constructs and activates a binding to start an action when an "int" is at balance and a "Port<int>" (i.e., a port that takes an int) is at "balanceRequest." This action sends these two messages as arguments to the delegate, which sends the current balance back to "balance," thus maintaining the invariant that the current balance is always waiting at "balance," and to the "continuation" port from "balanceRequest."

We initialize the current balance by posting it to "balance."
    balance.post(0);

The client can now deposit various amounts into the cashbox using deposit.post.
    deposit.post(100);
    deposit.post(50);
    . . . ;

These two messages to "deposit" start two new actions, each of which increments the balance by the specified amount. These two new actions cannot execute concurrently with each other, because starting each action requires a message on "balance" as well as a message on "deposit." As soon as one action starts, the next message on "deposit" must wait for another message on "balance." The same message cannot start more than one action. This eliminates a race condition typical in other programming models. Similarly, there is at most one "int" at "balance" at any moment, since the old argument is consumed before the new one is posted, and since the client cannot post directly to "balance."

Figure 4:
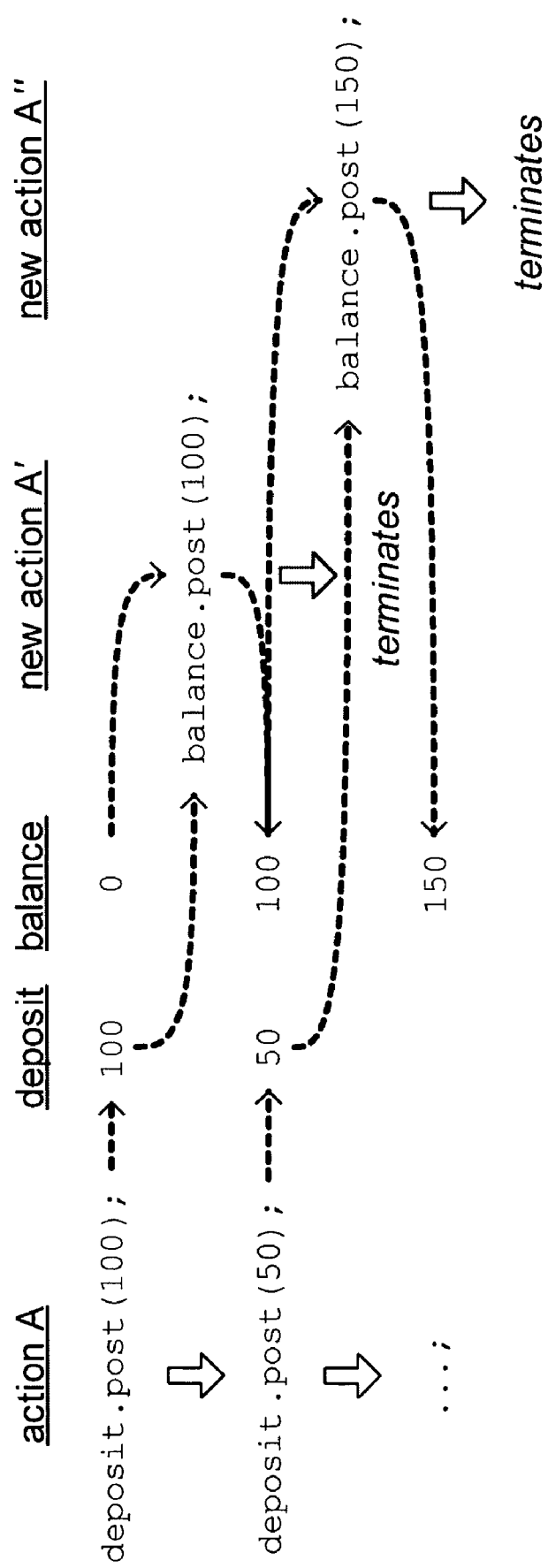
FIG. 4 illustrates another data and control flow example.

FIG. 4 illustrates the data flow and control flow for this example. Just before the first post to "deposit," the current balance at "balance" is 0. Action A posts 100 to "deposit." The 100 joins the current balance from "balance" as both become arguments to a new action (A') that posts the new current balance to balance and terminates. Next, action A posts 50 to deposit. The 50 joins the current balance from balance as both become arguments to another new action (A"), which again posts the new current balance to "balance" and terminates. Meanwhile, action A continues its execution. Actions A, A', and A" can execute concurrently.

Retrieving the balance takes a little more code in the client.

```
Port<int> withBalance = new Port<int>( );
activate(withBalance,
    delegate(int b) {
        log.post(String.Format("balance = {0}", b));
    });
balanceRequest.post(withBalance);
```

Here, a new port, "withBalance," can be created, which takes an "int," and binds it to a method that logs the current balance using the "log" port from the previous example. Sending "withBalance" to "balanceRequest" starts an action that sends the current balance to "with Balance," which starts a new action that sends a message to "log," which starts a new action that prints the message.

Consider a second example of an extended cashbox that allows withdrawals as well as deposits, but does not allow for withdrawing more money than is available. An attempted withdrawal with insufficient funds will wait until more money is deposited. New ports "deposit," "withdraw," "balance," "withdrawalWaiting," and "noWithdrawalWaiting" may be defined.

Port<int>deposit=new Port<int>( ).

As before, "deposit" takes an "int," and increments the balance by that amount.

```
class Withdrawal {
    public int n;
    public Port<MsgSuccess> continuation;
}
```

"Withdrawal" is the type of the argument to the new "withdrawalWaiting" port. "MsgSuccess" is a built-in CCR type similar to void.

Port<Port<MsgSuccess>>withdraw=new
        Port<Withdrawal>( ).

The new "withdraw" port takes a continuation port that takes a "Withdrawal," and performs the withdrawal. The continuation port in the "Withdrawal" gets a "MsgSuccess" when the withdrawal has completed.

Port<int>balance=new Port<int>( ).

As before, "balance" takes an "int," which is the current balance. The current balance for the cashbox is always waiting at balance. As before, the client cannot post directly to "balance." It is internal to the implementation.

Port<Withdrawal>withdrawalWaiting=new
        Port<Withdrawal>( ).

The new internal withdrawalWaiting port has a Withdrawal waiting when a withdrawal is in progress. At any time, at most one Withdrawal can be waiting on withdrawalWaiting. The client cannot post directly to withdrawalWaiting; it is internal to the implementation.

Port<MsgSuccess>noWithdrawalWaiting=new
        Port<MsgSuccess>( ).

The new "noWithdrawalWaiting" port has a "MsgSuccess" when no withdrawal is waiting. The client cannot post directly to "noWithdrawalWaiting." It is internal to the implementation.

Again, methods may be bound to these ports.

activate(!join<int, int, MsgSuccess>(balance, deposit, noWithdrawalWaiting)
  .with(delegate(int b, int d, MsgSuccess n) {balance.post (b+d);}));

This "activate" defines the operation of "deposit" when no withdrawal is waiting, i.e., when an "int" is at "balance," an "int" is at "deposit," and a "MsgSuccess" is at "noWithdrawalWaiting." The action sends these three messages as arguments to the delegate, which sends the new balance to "balance."

```
activate(!join<int, int, MsgSuccess>(balance, deposit, withdrawalWaiting)
    .with(delegate(int b, int d, Withdrawal w) {
        if (b + d < w.n) {
            balance.post(b + d);
            withdrawalWaiting.post(w);
        } else {
            balance.post(b + d - w.n);
            noWithdrawalWaiting.post(new MsgSuccess( ));
            w.continuation.post(new MsgSuccess( ));
        }
    }));
```

This "activate" defines the operation of "deposit" when a withdrawal is waiting, i.e., when an "int" is at "balance," an "int" is at "deposit," and a "Withdrawal" is at "withdrawalWaiting." The action sends these three messages as arguments to the delegate.

If the deposit is for less than the waiting withdrawal amount, then the full amount is deposited. Otherwise, the withdrawal can be completed, posting a message to "noWithdrawalWaiting." The current balance can be recomputed, and a "MsgSuccess" posted to the withdrawal's continuation.

```
activate(!join<int, Port<MsgSuccess>, MsgSuccess>(
        balance, withdraw, noWithdrawalWaiting)
    .with(delegate(int b, Withdrawal w, MsgSuccess n) {
        if (w.n <= b) {
            balance.post(b - w.n);
            noWithdrawalWaiting(new MsgSuccess( ));
            w.continuation.post(new MsgSuccess( ));
        } else {
            balance.post(b);
            withdrawalWaiting.post(w);
        }
    }));
```

This "activate" defines the operation of "withdraw" when no withdrawal is waiting, i.e., when an "int" is at "balance," a "Withdrawal" is at "withdraw," and a "MsgSuccess" is at "noWithdrawalWaiting." The action sends these three messages as arguments to the delegate. If the withdrawal amount does not exceed the current balance, then it may be subtracted from the remaining balance and the client notified. There is still no withdrawal waiting. Otherwise, the "Withdrawal" is sent to "withdrawalWaiting." If a "Withdrawal" message arrives at "withdraw" when another withdrawal is already waiting (i.e., when "withdrawalWaiting" has a message, so that "noWithdrawalWaiting" does not), there is no defined action, and the "Withdrawal" message waits at "withdraw" until its turn.

The initial balance is zero, and there are no withdrawals waiting:

```
balance.post(0);
noWithdrawalWaiting(new MsgSuccess( )).
As before, the client can deposit money into the cashbox with
"deposit.post."
    deposit.post(100);
    deposit.post(50).
Performing the withdrawal takes a little more code in the client.
    Port<MsgSuccess> afterWithdrawal = new Port<MsgSuccess>( );
    activate(afterWithdrawal,
        delegate(MsgSuccess v) {
            log.post("withdrawal succeeded");
            ...( );
        });
    withdrawal.post(new Withdrawal(200, afterWithdrawal));
```

Here, a new port, "afterWithdrawal," is created, which takes a "MsgSuccess." It may be bound to a delegate that logs the withdrawal and then does some further work. A new "Withdrawal" for 200 dollars may be sent to it that includes "afterWithdrawal." This starts the withdrawal. The delegate runs after the withdrawal is complete, which in this case requires 50 more dollars to be deposited.

As described above, ports can take messages of a particular type. The CCR, however, also lets ports take messages of multiple types, with separate bindings for the separate message types. Consider the first cashbox example described above. Instead of three ports, "balance," "deposit," and "balanceRequest," one port, "cashbox," may be used that takes messages of type "Balance," "Deposit," or "BalanceRequest."

public class Balance {public int n;}
public class Deposit {public int n;}
public class BalanceRequest {public Port<Port<int>>continuation;}
Port<Balance, Deposit, BalanceRequest>
cashbox=new Port<Balance, Deposit, BalanceRequest>( );

The "cashbox" port takes a "Balance," a "Deposit," or a "BalanceRequest" as an argument.

When methods are bound to "cashbox," the different types of the messages determine the different uses of the port.

```
activate(!join<Balance, Deposit>(cashbox, cashbox)
    .with(delegate(Balance b, Deposit d) {
        cashbox.post(new Balance(b.n + d.n));
    }));
activate(!join<Balance, BalanceRequest>(cashbox, cashbox)
    .with(delegate(Balance b, BalanceRequest req) {
        cashbox.post(b);
        req.continuation.post(b.n);
    }));
```

The current balance may be initialized using "cashbox.post."

cashbox.post(new Balance(0));

The client can now deposit various amounts into the cashbox using "cashbox.post."

cashbox.post(new Deposit(100));
cashbox.post(new Deposit(50));

With this change, this example works the same as before.

Another example program, which simulates a disk scheduler, will now be described. A number of concurrent actions generate streams of disk requests. The requests in each stream must be processed in order, while requests in different streams may be interleaved.

A disk with one million blocks may be simulated:
const int DiskSize=1000000;

The port "headAt" may be created to record the current head position (initially 0). The client cannot post directly to "headAt." It is internal to the implementation.
Port<int>headAt=new Port<int>( );
headAt.post(0);

A "Request" stores a request to seek the head to position "n" and call "op" (e.g., to read a block).
public class Request {int n; Port<MsgSuccess>op;}

"Distance" computes the distance from the current head position to head position n in terms of an elevator algorithm. An elevator policy performs its requested operations in order of non-decreasing block address, for efficiency, then repeats.

```
public static int Distance(int at, int n) {
    return (n − at + DiskSize) % DiskSize;
}
```

```
public static bool Sooner(int at, int n1, int n2) {
    return Distance(at, n1) < Distance(at, n2);
}
```

A list of pending requests may be maintained, sorted by the results of "Sooner." "InsertionSort" inserts a request into the sorted list.

```
public static List<Request>
InsertionSort(int at, List<Request> list, Request req) {
    if (list.Count > 0) {
        Request req__ = list[0];
        list = list.Clone( );
        if (Sooner(at, req.n, req__.n)) {
            list.Insert(0, req);
        } else {
            list.Remove(0);
            list = InsertionSort(at, list, req);
            list.Insert(0, req__);
        }
        return list;
    } else {
        list = list.Clone( );
        list.Insert(0, insert.req);
        return list;
    }
}
```

The "pending" port may be created to hold one or more pending requests; the "nonePending" port if there are none. The client cannot post directly to "pending" and "nonePending." They are part of the implementation.
Port<List<Request>>pending=new Port<List<Request>>( );
Port<MsgSuccess>nonePending=new Port<MsgSuccess>( ).

We create an "addRequest" port for the client to post new requests.
Port<Request>addRequest=new Port<Request>( );

We create a "service" port and send it a "MsgSuccess" when requests are pending but no request is in progress. Its action removes the first pending request from the list, seeks the head, performs the operation, and sends another message to "service" to handle the next request. The client cannot post directly to the "service" port. It is part of the implementation.
Port<MsgSuccess>service=new Port<MsgSuccess>( ).

Now that the ports have created, their bindings can be created and activated.

```
activate(!join<int, List<Request>, Request>(
    headAt, pending, addRequest)
    .with(delegate(int at, List<Request> 1, Request req) {
        pending.post(InsertionSort(at, 1, req));
        headAt.post(at);
    }));
activate(!join<MsgSuccess, Request>(nonePending, addRequest)
    .with(delegate(MsgSuccess n, Request req) {
        pending.post(new List<Request>(req));
    }));
activate(!join<List<Request>, MsgSuccess>(pending, service)
    .with(delegate(List<Request> 1, MsgSuccess s) {
        Request req = 1[0];
        1 = 1.Clone( );
        1.Remove(0);
        seekHead.post(req.n);
        if (1.Length = 0) {
            nonePending.post(new MsgSuccess( ));
        } else {
            pending.post(1);
        }
        req.op.post(new MsgSuccess( ));
        service.post(new MsgSuccess( ));
    }));
```

Calling "DoBlocks" simulates a sequential computation repeatedly reading random blocks. Its argument is a "BlocksRequest."

```
public class BlocksRequest { public int actionId; public int count; }
static Random random = new Random( );
public static void Blocks(BlocksRequest blocks) {
    if (blocks.count > 0) {
        int blockNo = random.Next(DiskSize);
        addRequest
            .post(new
                Request(n,
                    delegate(MsgSuccess s) {
                        Console.WriteLine("action {0}, block {1}",
                            blocks.actionId,
                            n);
                        DoBlocks(new BlocksRequest(blocks.actionId,
                            blocks.count − 1));
                    }));
    }
}
```

Note that "Blocks" is written in a continuation-passing style, since the next read should not start until the previous one has completed.

The disk head is initially at position 0. There are no pending requests yet, but requests may now be serviced.
headAt.post(0);
nonepending.post(new MsgSuccess( ));
service.post(new MsgSuccess( ));

A few concurrent computations, "DoBlocks," may be spawned, and the simulation runs.

```
for (int id = 0; id < 10; id++) {
    spawn(delegate(BlocksRequest req) { DoBlocks(req); },
        new BlocksRequest(id, 100));
}
```

Thus, there have been described systems and methods for effective programmability around concurrency that address the problem of latency in a distributed operating system. Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A computer-readable storage medium having encoded thereon a data structure comprising:
    a dynamic library for a managed programming language, the library including a core set of primitives implementing a core set of join-calculus-like and pi-calculus-like channels with input and asynchronous output capabilities for dynamic coordination and concurrency without requiring the use of threads and locks;
    wherein the library dynamically implements new join patterns during execution through dynamically nesting concurrency primitives comprising arbiters that wait for an appropriate message, and upon receipt of the appropriate message, continue execution.

2. The computer-readable storage medium of claim 1, wherein the library includes an atomic test-and-input primitive.

3. The computer-readable storage medium of claim 2, wherein the library includes arbiter primitives for choice, join, and replication.

4. The computer-readable storage medium of claim 3, wherein higher-level, derived arbiter operators may be encoded on top of the arbiter primitives to build up higher levels of abstraction.

5. The computer-readable storage medium of claim 4, wherein the derived arbiter operators include a scatter-gather and an interleave, an interleave being an implementation of a reader-writer lock.

6. The computer-readable storage medium of claim 1, wherein the managed programming language may be built upon to provide a capability to concurrently issue input-output requests to remote systems while simultaneously performing other functions locally to increase the efficiency of a distributed system.

7. The computer-readable storage medium of claim 1, wherein the library provides control flow parallelism.

8. The computer-readable storage medium of claim 1, wherein the managed programming language may be compiled down to the core set of primitives.

9. The computer-readable storage medium of claim 1, the library further comprising a hierarchical set of arbiters.

10. A computer-readable storage medium having encoded thereon a data structure comprising an extensible dynamic coordination and concurrency library adapted to be embedded in a managed programming language, the library implementing a core set of join-calculus-like and pi-calculus-like channels with input and asynchronous output capabilities for dynamic coordination and concurrency without requiring the use of threads and locks, the library comprising:
    a core set of primitives implementing queues for messages and coordinating processes, wherein all interaction may be on a single synchronization primitive defining a port;
    the core set of primitives comprising a set of arbiters that wait for an appropriate message and, upon receipt of the appropriate message, continue execution, wherein:
    arbiters are concurrency primitives that are nestable to implement derived operators and dynamically nestable through function calls to dynamically implement new join patterns during execution.

11. The computer-readable storage medium of claim 10, wherein an arbiter receiver may be waiting on the port.

12. The computer-readable storage medium of claim 10, wherein when a message arrives, code executes with the message as a parameter.

13. The computer-readable storage medium of claim 10, the library wherein the library provides for a hierarchical arbitration procedure wherein arbiters may be nested.

14. The computer-readable storage medium of claim 10, further comprising a scheduler adapted to activate a union of messages with receivers.

15. The computer-readable storage medium of claim 10, wherein CPU utilization may be throttled by a selected task according to a desired formula.

16. The computer-readable storage medium of claim 15, wherein the throttling is based on feedback control to effectively control runtime CPU usage.

17. The computer-readable storage medium of claim 10, wherein coordination primitives can be nested and executed as other work items.

18. A computer-readable storage medium having encoded thereon a data structure comprising an extensible coordination and concurrency library for access by a process, the library implementing a core set of join-calculus-like and pi-calculus-like channels with input and asynchronous output capabilities for dynamic coordination and concurrency without requiring the use of threads and locks, said library comprising:
    a set of ports, wherein each port is associated with a respective list of types;
    a set of dispatchers, wherein each dispatcher has a respective set of tasks, and a respective set of scheduler threads that execute the tasks, wherein the tasks include a list of storage slots for formal arguments; and
    a set of arbiters that wait an appropriate message and then continue upon receipt of the appropriate message, wherein:
    arbiters are concurrency primitives that are nestable to implement derived operators and dynamically nestable through function calls in order to dynamically implement new join patterns during execution;
    wherein the process submits asynchronous messages on the ports and is called to run when a continuation is executed, and
    wherein the library provides for dynamic control flow parallelism.

19. The computer-readable storage medium of claim 18, wherein each port contains a respective ordered list of pointers to objects in memory that constitute asynchronous messages on the port, and an atomic operation that tests for a message and removes it if it is present.

20. The computer-readable storage medium of claim 18, wherein when an arbiter is created, it is registered with a specified set of ports, and when a thread posts a message to a port, it first appends the message to the port's list, executes every arbiter registered on the port, unregisters one of the arbiters registered on the port, then returns, wherein the created arbiter may contain nested arbiters.

* * * * *